(12) United States Patent
Mahr et al.

(10) Patent No.: US 7,136,334 B2
(45) Date of Patent: Nov. 14, 2006

(54) APPLIANCE FOR RECORDING OR PLAYING BACK INFORMATION HAVING MEANS FOR SIGNAL GENERATION FROM A WOBBLE SIGNAL

(75) Inventors: Peter Mahr, Zell im Wiesental (DE); Michael Huonker, Rosenfeld-Isingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 256 days.

(21) Appl. No.: 10/496,276

(22) PCT Filed: Aug. 29, 2002

(86) PCT No.: PCT/EP02/09621

§ 371 (c)(1),
(2), (4) Date: May 21, 2004

(87) PCT Pub. No.: WO03/044781

PCT Pub. Date: May 30, 2003

(65) Prior Publication Data
US 2004/0257938 A1  Dec. 23, 2004

(30) Foreign Application Priority Data
Nov. 23, 2001  (DE) .............. 101 57 331

(51) Int. Cl.
*G11B 7/00* (2006.01)
(52) U.S. Cl. ............... 369/47.27; 369/47.18
(58) Field of Classification Search ........... 369/44.26, 369/44.32, 47.1, 47.27, 47.28, 44.13, 44.18
See application file for complete search history.

(56) References Cited

U.S. PATENT DOCUMENTS

| | | | |
|---|---|---|---|
| 4,067,044 A | 1/1978 | Maeda et al. ............ | 358/128 |
| 4,691,356 A | 9/1987 | Ichikawa ............ | 381/4 |
| 5,724,360 A | 3/1998 | Lundh et al. ............ | 370/516 |
| 6,088,307 A * | 7/2000 | Fushimi et al. ......... | 369/44.13 |
| 6,192,015 B1 | 2/2001 | Kim ...................... | 369/48 |
| 6,201,778 B1 | 3/2001 | Sensyu .................. | 369/59 |
| 6,236,629 B1 | 5/2001 | Hisakado et al. ....... | 369/47.32 |
| 6,266,200 B1 | 7/2001 | Hase et al. ............ | 360/51 |
| 6,310,851 B1 | 10/2001 | Tobita et al. .......... | 369/111 |
| 6,724,704 B1* | 4/2004 | Kuroda .................. | 369/47.28 |
| 2001/0019527 A1 | 9/2001 | Maeda et al. .......... | 369/111 |

FOREIGN PATENT DOCUMENTS

| | | |
|---|---|---|
| EP | 299573 | 1/1989 |
| EP | 833310 | 4/1998 |
| EP | 1056085 | 11/2000 |
| EP | 1098301 | 5/2001 |
| EP | 1184988 | 3/2002 |

OTHER PUBLICATIONS

Patent Abstracts of Japan, vol. 1998, No. 13, Nov. 30, 1998, & JP 10-208323 (U.S. Patent 6310851 corresponds) See Ref. AB.
Anonymous: "Phase-Locked Oscillator Charge Pump", IBM Technical Disclosure Bulletin, vol. 29, No. 2, Jul. 1, 1986, pp. 553-555.

\* cited by examiner

*Primary Examiner*—Nabil Hindi
(74) *Attorney, Agent, or Firm*—Joseph J. Laks; Robert D. Shedd; Reitseng Lin

(57) ABSTRACT

The invention proposes an appliance for recording or playing back information having means for signal generation from a wobble signal which is scanned from the undulating track on a recording medium, such as a DVD+RW. According to the invention, a signal scanned from the undulating recording track on the recording medium is supplied to a circuit arrangement for generating a clock signal which is both a square-wave voltage whose phase is synchronous with that of the signal and a signal with an even-numbered multiple of the frequency of the wobble signal contained in the signal. In this regard, the invention provides a phase locked loop which is synchronized with the signal and contains a frequency divider for actuating a digital phase shifter and for providing a clock signal which is a phase-synchronous square-wave voltage having the frequency of the wobble signal. The phase comparator provided is a multiplier which is formed using a changeover switch to which the signal and the inverted signal are applied. For decoding information contained in the waveform of the recording track on the recording medium, a circuit arrangement similar to the aforementioned multiplier is used whose changeover switch is actuated with the clock signal and to which a low-pass filter is connected. The signals generated using the means for signal generation are then made available to further functional units in the appliance for recording or playing back information for recording media with a wobble track.

23 Claims, 10 Drawing Sheets

Figure 1:
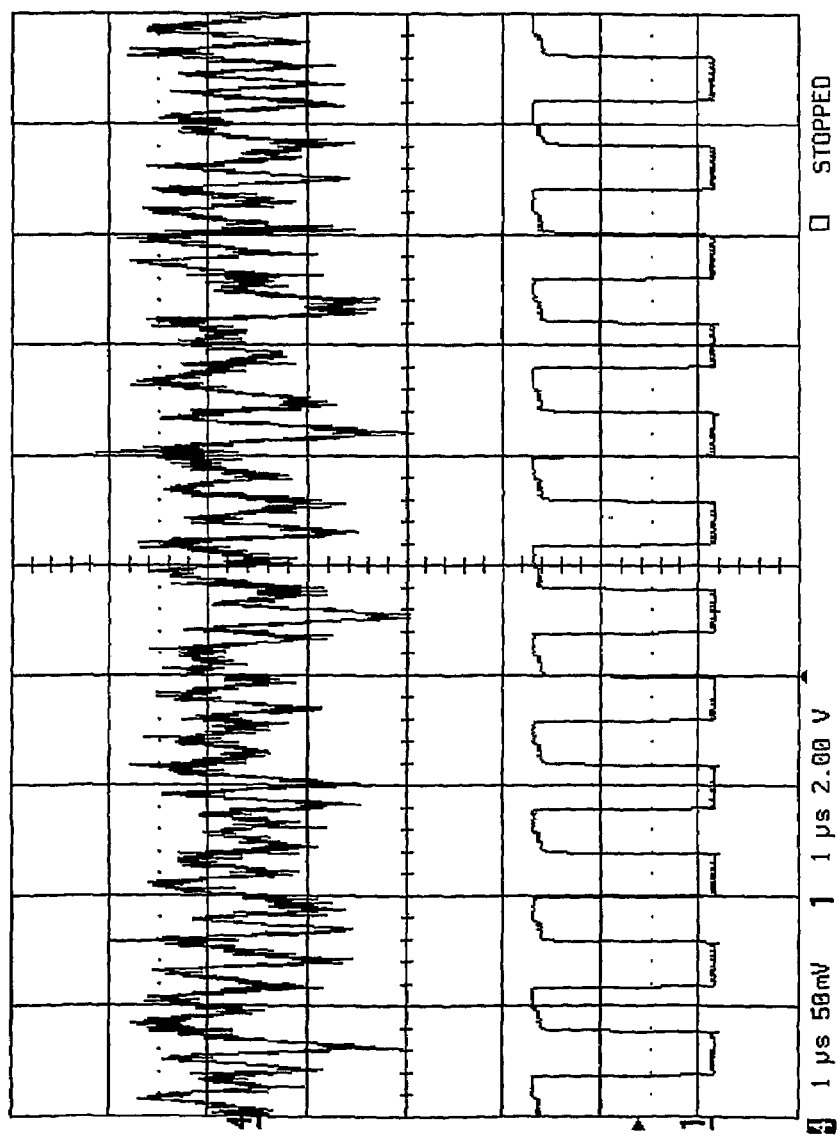

APPLIANCE FOR RECORDING OR PLAYING BACK INFORMATION HAVING MEANS FOR SIGNAL GENERATION FROM A WOBBLE SIGNAL

This application claims the benefit, under 35 U.S.C. § 365 of International Application PCT/EP02/09621, filed Aug. 29, 2002, which was published in accordance with PCT Article 21(2) on May 30, 2003 in English and which claims the benefit of German patent application No. 10157331.6, filed Nov. 23, 2001.

The present invention relates to an appliance for recording or playing back information having means for signal generation from a wobble signal which is scanned from the undulating track on a recording medium, such as a DVD+RW. The means for signal generation are used to generate a clock signal and to play back information contained in the waveform of the recording track on the recording medium.

Writeable optical recording media or optical recording media which are suitable for recording data or information generally have an undulating recording track, which is also referred to as a wobble track or pregroove. Information to be played back from the recording medium or to be recorded on the recording medium is or becomes stored in the undulating recording track using pits and grooves or by changing the optical properties of the recording medium. In addition, the waveform of the recording track contains information about the scanning location and possibly further supplementary information, such as the name of the manufacturer of the disc or information about the laser power which needs to be used for recording information or data. This information is contained in the waveform of the recording track as a result of frequency modulation in the case of minidisc or as a result of phase modulation in the case of DVD+RW and is referred to as the wobble signal, which is scanned from the recording medium in addition to the information which is to be recorded or to be played back. The wobble signal, as scanned from a DVD+RW, for example, has a very high proportion of noise, however, which means that suitable means need to be provided which are used to generate the wobble signal or information contained in the wobble signal from the signal detected from the recording medium, for example in order to be able to use it to ascertain the current scanning location or to control the timing of the write operation.

It is therefore an object of the present invention to detect the wobble signal or information contained in the wobble signal, which information is contained in a signal scanned from the optical recording medium, reliably and with little involvement and to make information contained therein available to other functional units for evaluation purposes in a suitable manner.

This object is achieved by means of features specified in independent patent claims. Other advantageous refinements and developments of the invention are specified in subclaims.

In accordance with one aspect of the invention, means are provided which are used to generate, from a signal scanned from the waveform of the recording track on an optical recording medium, such as a DVD+RW, a square-wave voltage whose phase is synchronous with that of the wobble signal and which forms a clock signal with an even-numbered multiple of the frequency of the wobble signal. When generating the clock signal, a clock signal is advantageously also generated which matches the frequency of the wobble signal and is used to decode information contained in the wobble signal. The signal scanned from the optical recording medium is very noisy, and a circuit arrangement is nevertheless used to generate a phase-synchronous clock signal or to decode information contained in the wobble signal, said information being made available in a suitable manner to other functional units for evaluation purposes or for controlling the appliance. The circuit arrangement requires little complexity and contains a multiplier whose fundamental design allows it to be used both for generating the clock signal and for decoding information contained in the wobble signal. The multiplier used is a circuit arrangement comprising a changeover switch and an invertor.

On a recording medium with a wobble track, such as a rewriteable DVD, which is also called a DVD+RW, the wobbling of the track consists in a sinusoidal deviation from a nominal or symbolic centre line of a spiral track with a constant wavelength. The wobbling is phase-modulated and therefore has sudden phase changes. The wobble track is provided in the form of a depression or elevation in or on the recording medium, and is used to control the write speed and as a sector address and possibly for further supplementary information. The wobble signal is recorded on the recording medium at a constant linear speed, and the wobble modulation contains information, stored in digital form, about the scanning location or the physical address, as specified in the ECMA standard for the DVD+RW, for example. However, the signal as scanned from the recording medium using optical means contains a very high proportion of noise, which is why it is also called a noisy signal, which means that suitable means need to be provided which are used to generate the wobble signal or information contained in the wobble signal from the signal detected from the recording medium. To this end, clock signal generation from the signal detected from the optical recording medium is provided, and the clock signal, whose form differs from the modulation signal specified in the ECMA standard, is then advantageously used to recover the information contained in the wobble signal. The recovery of information contained in the wobble modulation is made possible by virtue of a clock signal being generated which is both a square-wave voltage whose phase is synchronous with that of the wobble signal and preferably a signal with twice the frequency as compared with the frequency of the wobble signal. In principle, it would also be possible to use a higher even-numbered multiple of the frequency as compared with the frequency of the wobble signal, as is required for generating the write clock, for example. The use of twice the frequency is advantageous in terms of low jitter, however. On account of these properties of the clock signal generated from the signal detected from the recording medium, there is then sufficient signal information available to allow decoding of information contained in the wobble signal, even though the form of the clock signal and of the signal used for recovering information contained in the wobble track differs from the form of the signals used to record the information in the wobble track on the recording medium. In this regard, an arrangement for clock signal generation is provided which, as the input signal or as the signal scanned from the optical recording medium, uses a signal which is formed using a pickup as a "push-pull" signal. The push-pull signal is supplied to the arrangement for clock signal generation, preferably via a bandpass filter which masks out the frequency components which are not required for evaluation purposes. The arrangement for clock signal generation is used to provide filtering and clock recovery for the wobble signal contained in the detected signal. The arrangement contains a phase locked loop, referred to as a PLL, which is synchronized with the input signal. In this regard, the phase comparator provided is a multiplier, operating on an analogue basis, to which the signal detected from the recording medium is supplied as an input signal and to which the digital output signal from a frequency-controlled square-wave generator is supplied as a comparison signal. In this respect, the output of the multiplier is connected via a loop filter to the input of a voltage-controlled oscillator, referred to as a VCO, which generates a clock signal with an even-numbered multiple of the frequency of the wobble signal, which is supplied to a digital phase shifter directly and in a form divided by the multiple used. The digital output signal from a frequency-controlled square-wave generator, which is a digital phase shifter, can only adopt the logic states zero and one, however. The output of the multiplier then provides the detected signal directly in the case of the logic one state and provides the inverted signal in the case of the logic zero state. In the circuit arrangement, this is implemented using an invertor and a fast changeover switch which is switched using the signal from the square-wave generator. Such a multiplier has the property that its mean output signal is zero whenever the input signals are applied with a phase shift of 90°. This is not desirable, however, which means that a digital phase shifter via which the output of the VCO is connected to the input of the multiplier is provided for compensation purposes. The digital phase shifter is preferably formed by a frequency divider in connection with an EX-OR gate. As a result, a clock signal is generated which is both a square-wave voltage whose phase is synchronous with that of the wobble signal and a signal with an even-numbered multiple of the frequency as compared with the frequency of the wobble signal. This clock signal is then used as a basis for subsequent functions in the appliance for recording or playing back information. Such functions are, by way of example, the evaluation of information contained in the wobble signal, the write clock for recording information, or rotation-speed control for the optical recording medium.

The write clock is formed as a multiple of the frequency of the clock signal, preferably using an additional PLL, and the information contained in the wobble signal or in the signal detected from the recording medium is evaluated by actuating switches using a frequency-divided clock signal, said switches supplying the signal detected from the recording medium to a digital evaluation device via a low-pass filter and a comparator. The frequency-divided clock signal corresponds to the frequency of the wobble signal and is phase-synchronous with respect thereto. In addition, to control the rotation speed of the optical recording medium, frequency division of the clock signal is used to provide the actual rotation speed for the spindle servo.

In addition, the solutions below are specified for resolving the conflict between a wide capture range and a high selectivity for the PLL.

For a mean analogue input signal, the voltage-controlled square-wave generator delivers a mid-frequency. As a result of appropriate dimensioning, this frequency should be close to the wobble frequency which can be expected, which has twice the value in the case of the solution indicated above by way of example. To achieve a high level of selectivity, the frequency variation should be small in relation to the control voltage. Provision is therefore made for the gradient of the voltage-controlled square-wave generator to be changed according to the respective requirements. In this case, a steep curve, resulting in small frequency changes in the event of a large input voltage change for the VCO, characterizes a high level of selectivity, but little frequency variation. A shallow curve can process a larger frequency variation, but results in low selectivity. This property is utilized such that a shallow curve is chosen in order to identify the wobble signal. That is to say the PLL can lock onto the detected wobble frequency. The characteristic curve is then controlled more steeply, as a result of which the necessary selectivity is attained. The mid-frequency is aligned accordingly in this case.

In accordance with another embodiment, the phase locked loop contains an adder which is arranged between the phase comparator and the VCO. For the locking operation, a triangular-wave voltage is applied to the adder. The effect achieved by this is that a prescribed frequency range is swept through, as a result of which the PLL locks when the frequency of the VCO matches the wobble frequency. At this moment, the value of the triangular-wave voltage is held or stored, so that the PLL can continue to oscillate normally.

The advantages of the inventive clock signal generation are very high selectivity for a wide frequency range as a result of control of the VCO's mid-frequency, concurrent operation of the filter for a fluctuating wobble frequency, and very low jitter in the generated clock signal. Furthermore, the arrangement for clock signal generation requires little complexity for making available information contained in the wobble signal to other functional units for evaluation purposes reliably and in a suitable manner. As a result of the digital phase shifter needing to be provided with a clock signal having an even-numbered multiple of the wobble frequency and with a clock signal divided by the multiple used, a clock signal is advantageously available which corresponds to the wobble frequency and is suitable for decoding information contained as ADIP information in the signal detected from the recording medium.

The ADIP information contained in the wobble track on the recording medium is provided for the purpose of making available information about the scanning location of the optical scanner and for the purpose of associating the detected signals with a time, as is necessary for controlling the writing unit, for example. The ADIP information is characterized by three signal types, the sync pulse, the logic zero and the logic one, and is formed by inverting a few wobbles or by phase modulation in a prescribed wobble cycle. In the case of the DVD+RW, a wobble cycle comprises eight wobble oscillations which can be referred to as positive or negative wobbling according to the direction in which the wobble oscillation starts. Positive wobbling is characterized in that the wobble track starts by deflecting the recording track on the recording medium towards the inside of the recording medium. As a modulation rule for the DVD+RW, in the case of the sync pulse, the phase of the first four oscillations is rotated through 180° and the remaining four oscillations are in normal phase. A zero is produced when the phase angle of oscillations 0, 6 and 7 is rotated, and for a one the phase angle of oscillations 0, 4 and 5 is rotated.

In order to detect the ADIP information contained in the very noisy signal which is scanned from the waveform of the recording track on the recording medium, a circuit arrangement is provided which comprises a changeover switch used to supply the signal scanned from the recording medium to a low-pass filter alternately in sync with the clock signal directly and in inverted form. Preferably, a comparator is connected downstream of the low-pass filter in order to digitize the output signal. The output of this circuit arrangement provides a signal which corresponds to the information stored in digital form in the wobble signal, for example the ADIP information. The ADIP information is then evaluated using a downstream logic circuit in order, by way of example, to provide the information about the location of scanning on the recording medium or other information stored in the wobble track.

A multiplier containing an invertor and a changeover switch is thus advantageously used for clock signal generation and for recovering information from a signal which is scanned from the waveform of the recording track on the recording medium.

For clock signal generation or for generating a square-wave voltage whose phase is synchronous with that of the signal detected from the undulating recording track on the recording medium, the changeover switch, to which the signal is applied directly and in inverted form, is actuated using a digital phase shifter to which a voltage-controlled oscillator connected to the multiplier via a loop filter supplies square-wave signals having twice the frequency and the frequency of the wobble signal. This synchronizes the phase locked loop which has been formed with the signal detected from the undulating recording track on the recording medium or with the wobble signal.

In a circuit arrangement for decoding information contained in the wobble signal, the multiplier's changeover switch is controlled with the clock signal whose phase is synchronous with that of the wobble signal, and the signal applied to the changeover switch directly and in inverted form is supplied to a low-pass filter.

An appliance for recording or playing back information having means for signal generation from a wobble signal which is scanned from the undulating track on a recording medium preferably uses a photodetector, already present in the appliance, which is used to provide a push-pull signal. The push-pull signal contains the wobble signal scanned from the optical recording medium, which wobble signal is very noisy and is supplied to the means for signal generation from a wobble signal preferably via a simple bandpass filter. The means for signal generation provided are a circuit arrangement for generating a clock signal and a circuit arrangement for decoding the information contained in the wobble signal, or a circuit arrangement for wobble filtering. These circuit arrangements are preferably combined to form a wobble detection circuit whose outputs are connected to means for processing ADIP information contained in the decoded wobble signal or to means for bit decoding and to means for controlling the rotation speed and the write process on the recording medium. In the circuit arrangements provided as means for signal generation, a multiplier formed using an invertor and a changeover switch is then preferably used.

In addition, provision is made for the clock signal or a clock signal derived from the clock signal to be used for positioning or ascertaining the position of the scanning device on the recording medium. To this end, a clock signal which can be expected at a radial position on the recording medium at a prescribed rotation speed is compared with the clock signal detected from the recording track on the recording medium using the aforementioned means. In this case, clock signal derived from the clock signal is intended to be understood to mean any clock signal which is derived, by frequency division or frequency multiplication, from the clock signal with twice the frequency as compared with the wobble frequency, and to carry out the comparison a microprocessor present in the appliance is provided which actuates an appropriate control unit in order to position the scanning device. A writing device provided for recording information is also referred to as a scanning device.

The objects, features and advantages of the present invention cited above, and also other objects, features and advantages of the present invention, are explained in more detail below in drawings using exemplary embodiments of the invention.

In the Drawings

Figure 2:
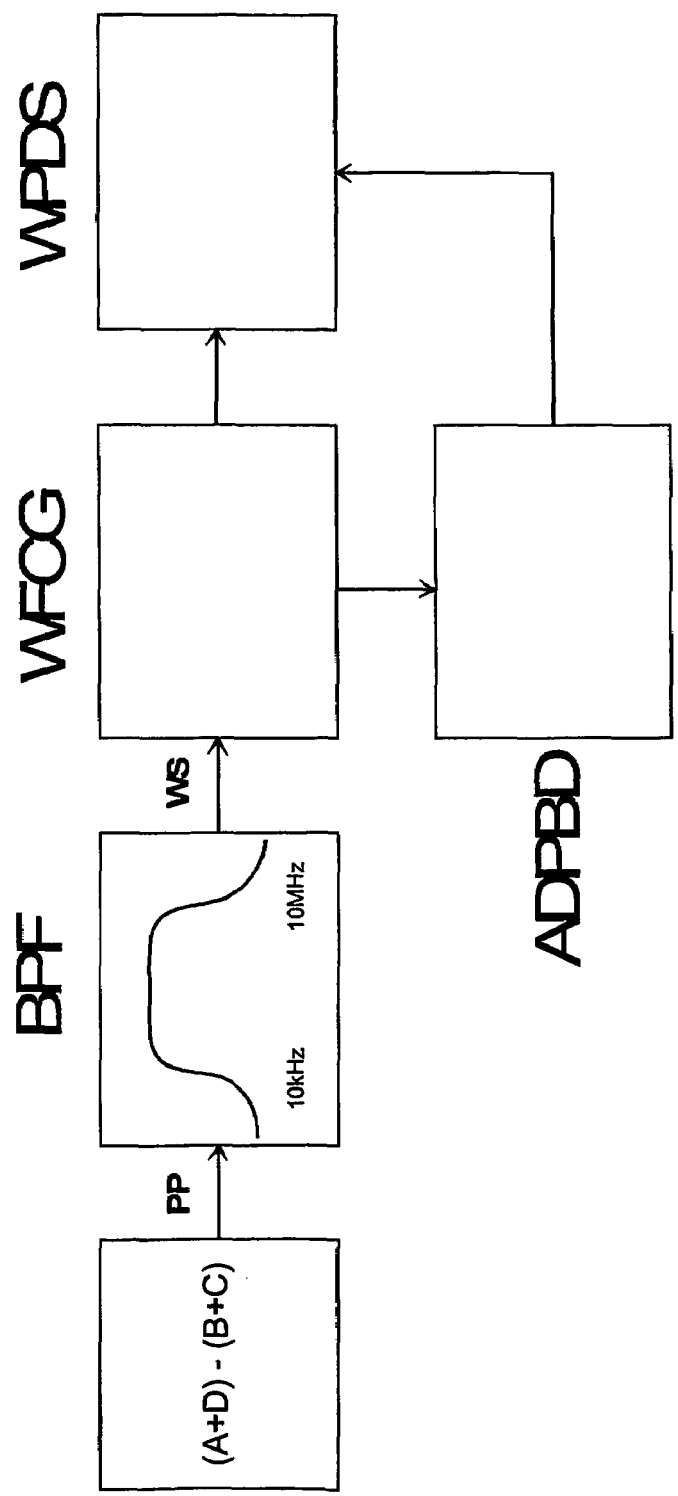
Figure 3:
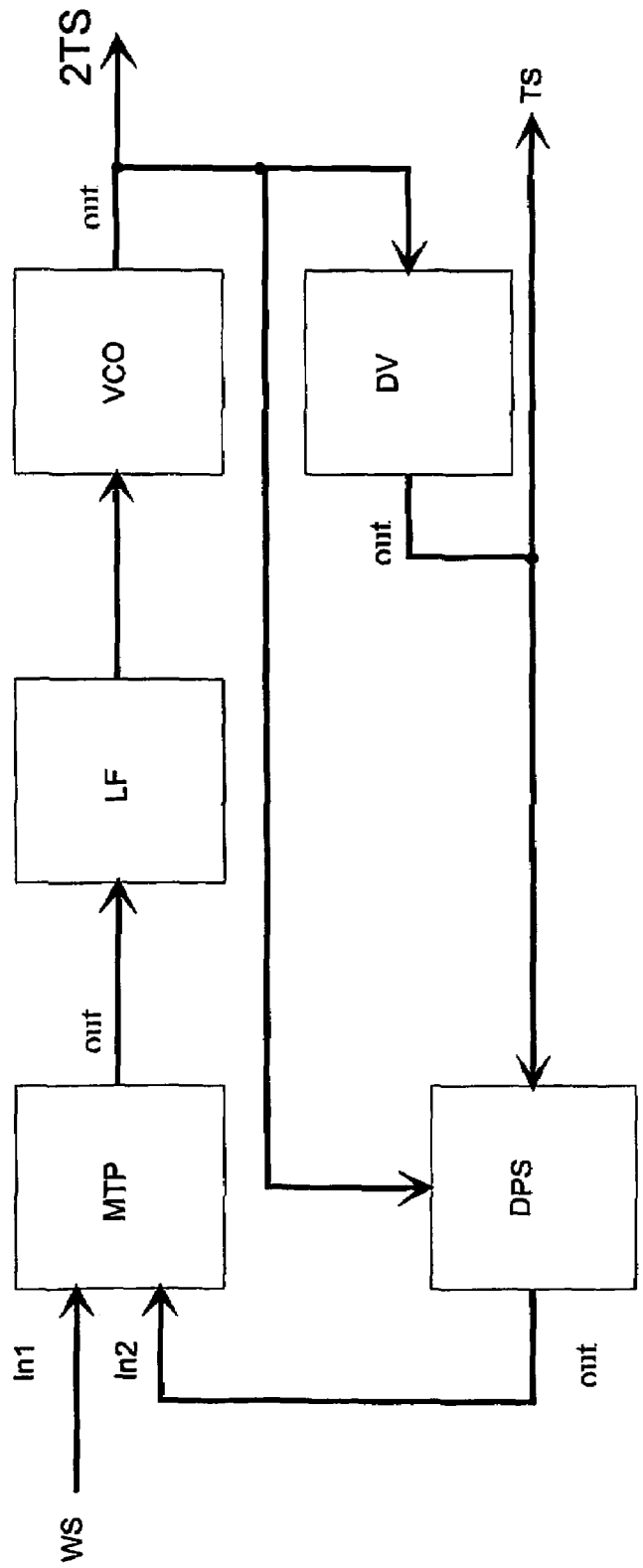
Figure 4:
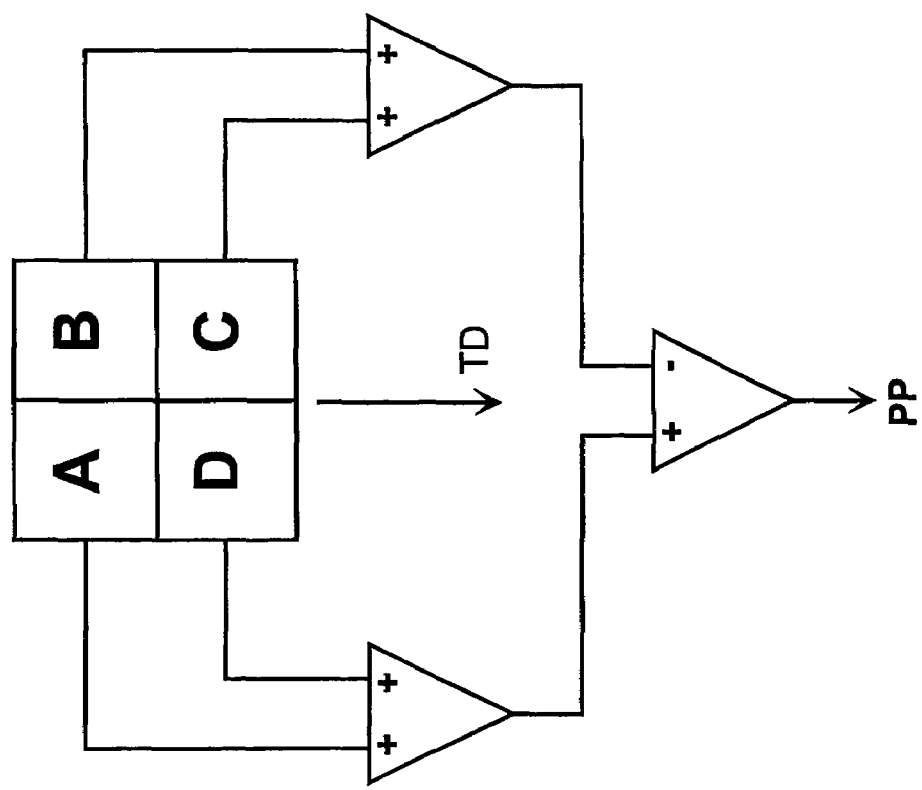
Figure 5:
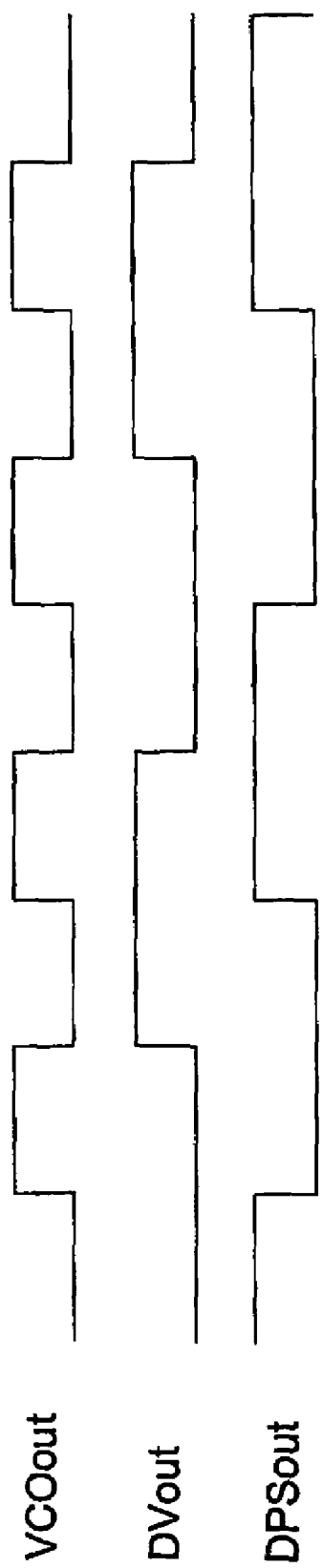
Figure 6:
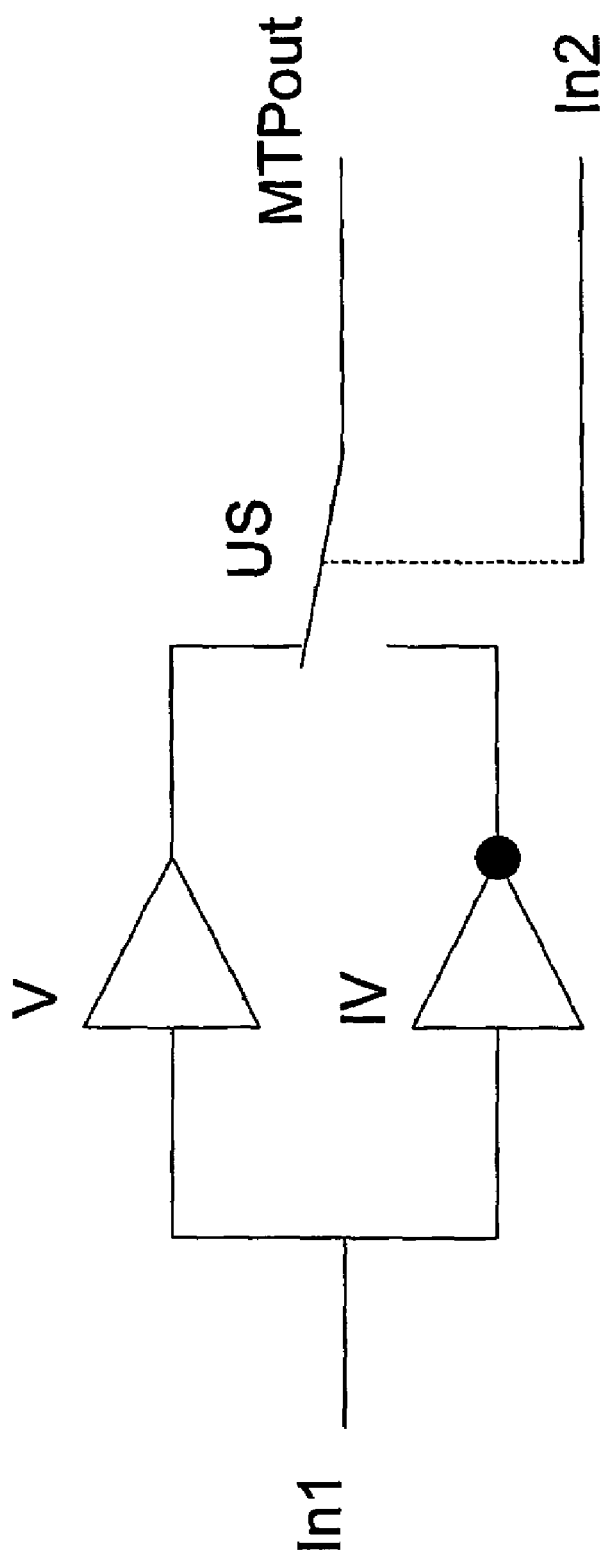
Figure 7:
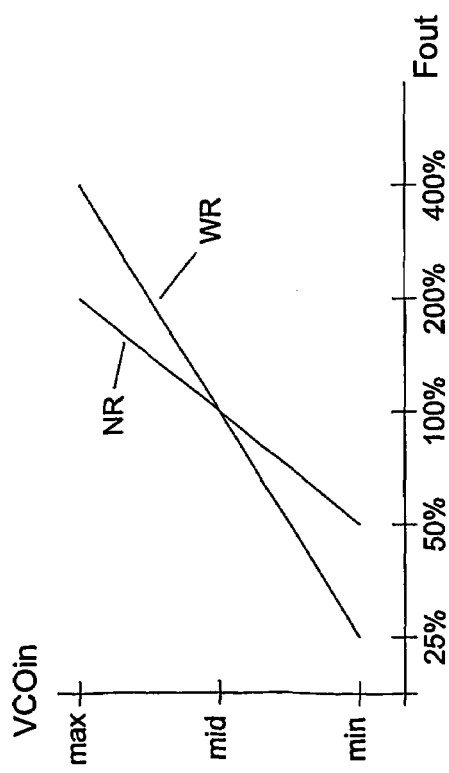
Figure 8:
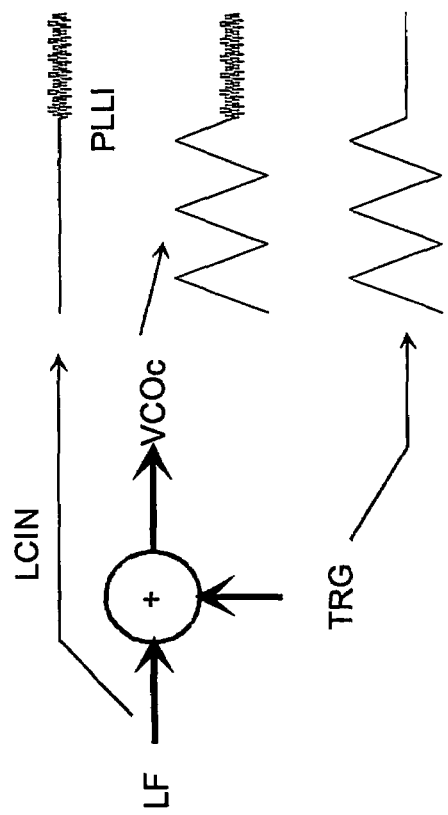
Figure 9:
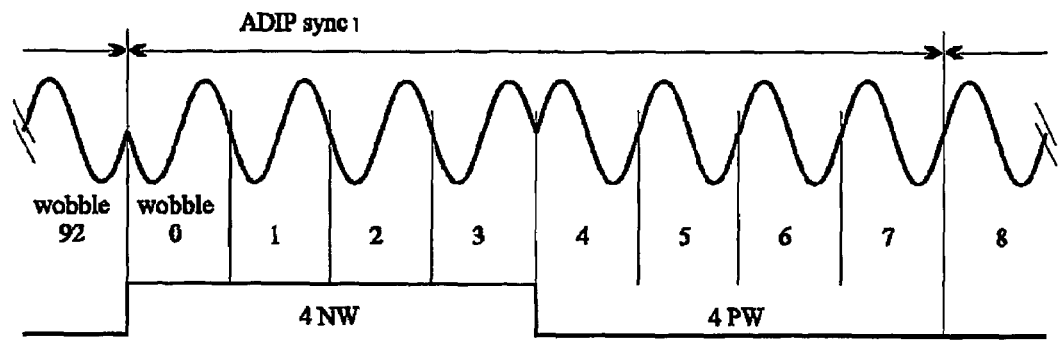
Figure 10:
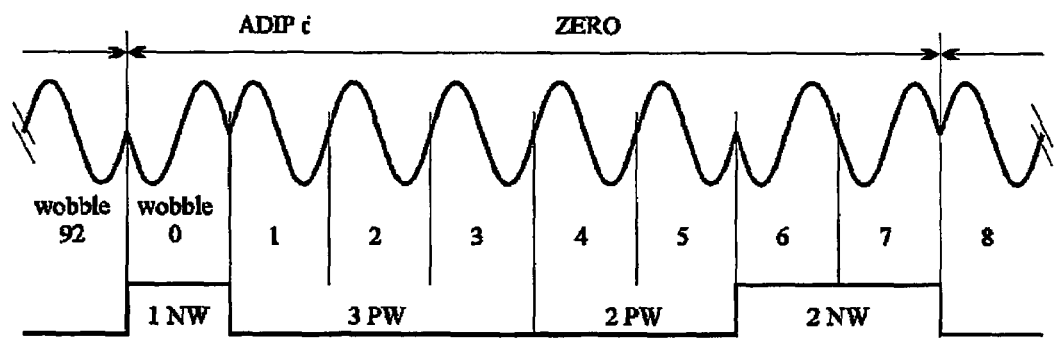
Figure 11:
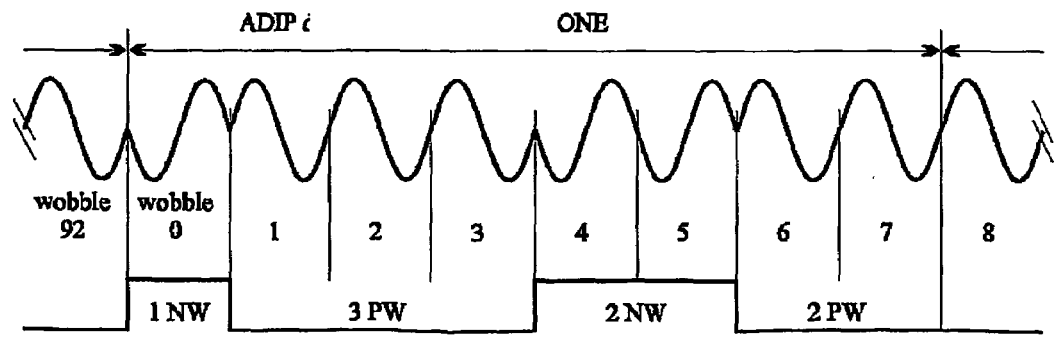
Figure 12:
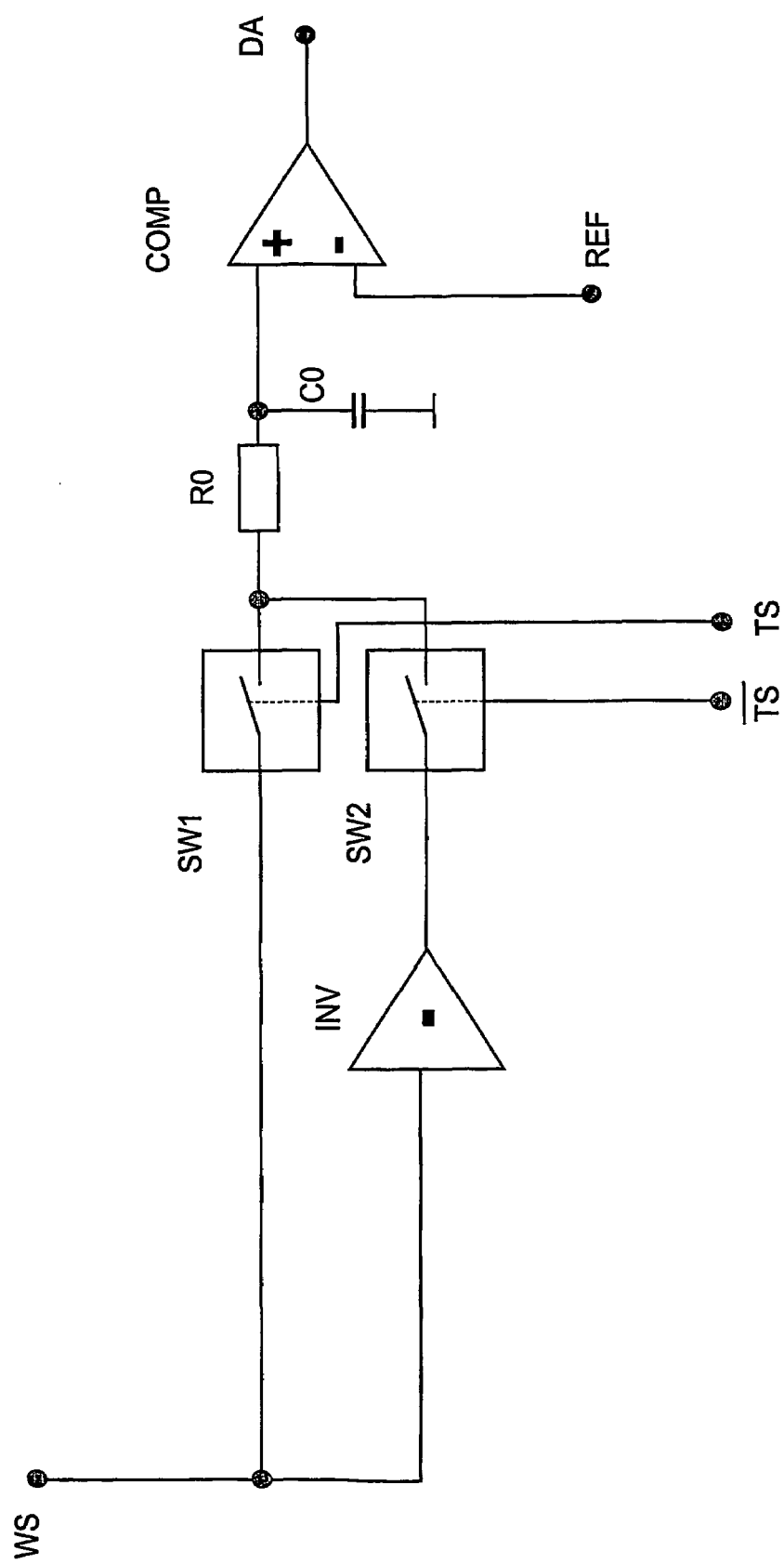
Figure 13:
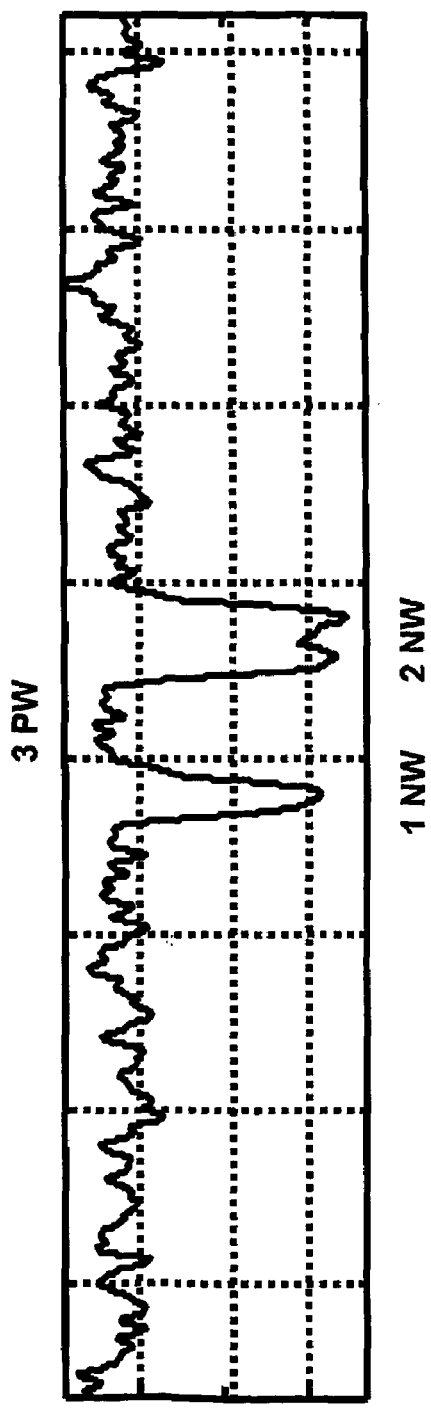

FIG. 1 shows a graphical illustration of a wobble signal WS detected from the recording medium and of the clock signal TS generated thereby, FIG. 2 shows a block diagram of the means for signal generation from a wobble signal, FIG. 3 shows a block diagram of the circuit arrangement for clock signal generation, FIG. 4 shows a schematic illustration of the arrangement for forming a push-pull signal PP, FIG. 5 shows a schematic illustration of the input signals and the output signal for a digital phase shifter DPS, FIG. 6 shows a block diagram of the circuit arrangement of a multiplier MTP, FIG. 7 shows a schematic illustration of the control curves for the voltage-controlled oscillator VCO, FIG. 8 shows a basic sketch to illustrate changeover of the PLL from the search mode to the lock mode, FIG. 9 shows sync pulse coding in the wobble signal, FIG. 10 shows a representation of a one in the wobble signal, FIG. 11 shows a representation of a zero in the wobble signal, FIG. 12 shows a circuit arrangement for decoding the wobble signal, and FIG. 13 shows a graphical illustration of a logic one decoded from the wobble signal.

The inventive arrangements and methods are intended for recording media with a wobble track, such as optical or magneto-optical discs, DVD+RWs or other write-once or rewriteable disc formats with a wobble track, called discs for short or recording media below. Although the invention is predominantly explained in connection with a DVD+RW below, this does not exclude its use for similar recording media from which a wobble signal can be detected, however.

Reference symbols are used largely concurrently in the drawings.

The DVD+RW is a rewriteable optical recording medium based on ECMA standard ECMA/TC31. The standard also reveals further details of the recording medium with regard to its wobble track. On the DVD+RW, the wobble track is formed by continuous, sinusoidal deviations from the centre line of a spiral track which store information about the location on the disc and further information in the form of a phase-modulated data signal. The wobble track is generally produced by stamping in the manufacturing process for the disc and, in the case of the DVD+RW, has a wobble period or wavelength of approximately 4.2656 μm. The wobble track is used to control the rotation speed or number of revolutions of the disc, to control the write operation on the disc and to stipulate or ascertain sector addresses. In addition, the wobble track formed by the waveform of the recording track on the recording medium can contain further supplementary information. Information which is stored in the wobble track is also referred to as ADIP or address-in-pregroove. The wobble track is present on the disc irrespective of the latter's unrecorded or recorded state and is recorded at a constant linear speed.

To scan a signal corresponding to the wobble track, a photodetector in the form of a "push-pull matrix" is provided, as shown in FIG. 4. The photodetector comprises four quadrants and provides the signals A, B, C and D, which are used in a known manner to generate a signal, also referred to as a push-pull signal PP, which contains the wobble signal. The push-pull signal PP is formed by adding the signals A and D and also B and C from detectors arranged in the track direction TD and by subsequently forming the difference for the summed signals. To separate signal and frequency components which are not required for evaluating information contained in the wobble signal, the push-pull signal PP is supplied, preferably via a simple bandpass filter, as a signal WS to a circuit arrangement for clock signal generation or to a circuit arrangement for decoding information contained in the wobble signal.

A signal WS detected from a DVD+RW using this arrangement is shown in the top depiction in FIG. 1. The illustration shows that the detected signal WS has a high proportion of interference or noise as compared with the modulation of the wobble track illustrated in ECMA standard ECMA/TC31. Provision is therefore made for a clock signal TS to be generated from the signal WS, said clock signal TS being shown in the bottom area of FIG. 1. In this regard, a clock signal 2TS is generated which is both a square-wave voltage whose phase is synchronous with that of the wobble signal or the signal WS and a signal with, preferably, twice the frequency as compared with the frequency of the signal WS. The real-time illustration shown in FIG. 1 shows that only a very small proportion of the generated clock signal TS is available as input signal in the detected signal WS or in the push-pull signal PP. However, the aforementioned properties of the clock signal TS generated from the signal WS detected from the recording medium provide sufficient signal information to allow decoding of information contained in the wobble signal. It is thus possible to dispense with the generation of a signal which corresponds exactly to the waveform of the recording track on the recording medium as a wobble signal, and it nevertheless becomes possible to decode information contained in the wobble track on the recording medium as a result of a square-wave voltage whose phase is synchronous with that of the wobble signal being generated and used as a clock signal. To generate the clock signal, an arrangement for clock signal generation, shown in FIG. 3 as a block diagram, is provided which, as an input signal or as a signal WS scanned or detected from the optical recording medium, uses the aforementioned push-pull signal PP which is supplied to the arrangement for clock signal generation, preferably via a simple passive bandpass filter BPF. The arrangement for clock signal generation shown in FIG. 3 contains a phase locked loop, also referred to as a PLL, which is synchronized with the signal WS. To this end, the signal WS scanned from the recording medium is supplied to a first input In1 of a multiplier MTP, operating on an analogue basis, which forms a phase comparator to which the digital output signal from a frequency-controlled square-wave generator is supplied as a comparison signal at the second input In2 of the multiplier MTP. The frequency-controlled square-wave generator is a digital phase shifter DPS which is actuated using a voltage-controlled square-wave signal generator VCO. An input signal at the first input In1 of the phase comparator is the detected signal WS, which is an analogue signal, and the comparison signal at the second input In2 of the phase comparator is the digital output signal from a frequency-controlled square-wave generator formed by the digital phase shifter DPS. The multiplier MTP used as a phase comparator is used to form, at the output of the multiplier MTP, the product of an analogue signal and a digital signal. Since, however, the comparison signal at the second input In2 of the phase comparator can, as a digital signal, adopt only the logic states zero and one, a simplification in terms of circuitry is provided in this regard. For the logic one state, the input signal is used, that is to say that in this case the detected signal WS is passed directly to the output MTPout of the multiplier MTP. The logic zero state signifies negation, in which case the inverted signal WS is output. The corresponding circuit arrangement for the multiplier MTP used is shown in FIG. 6. It comprises a changeover switch US and two amplifiers V and IV, among which one amplifier IV is inverting. Inverting amplifiers are also called invertors. A fundamental aspect is that the signal WS is supplied to the changeover switch US directly and in inverted form. The amplifier V is provided only out of practical considerations, in order to ensure that the signals supplied to the changeover switch US have a matching level and no propagation-delay differences. In the case of an invertor IV with a gain which is matched to the parallel path, the amplifier V can be replaced by a corresponding delay element or, if the propagation delay of the invertor is correspondingly low, by a simple line.

The inputs of the amplifiers V and IV are connected to one another and form the first input In1 of a phase comparator to which the signal WS scanned from the recording medium is supplied. The outputs of the amplifiers V and IV form, via the changeover switch US, the output MTPout of the multiplier MTP, and the changeover switch US is actuated using the digital phase shifter DPS in the form of a comparison signal. The control input of the changeover switch US thus forms the second input In2 of the phase comparator. The changeover switch US used in this case was a fast analogue MOS switch IC to which a loop filter LF or the loop filter of the phase locked loop is connected.

Such a multiplier MTP has the property that its mean output signal, that is to say measured downstream of the loop filter LF shown in FIG. 3, is zero when the input signals at the first and second inputs In1 and In2 of the phase comparator have a phase shift of 90°. This is not desirable, however, which means that the digital phase shifter DPS has been used for compensation purposes. A frequency divider DV in connection with an EX-OR gate achieves this object. FIG. 5 shows the output signal VCOout from the voltage-controlled oscillator VCO, which preferably provides a clock signal 2TS having twice the frequency as compared with the frequency of the wobble signal, the output signal from the frequency divider DVout and the output signal DPSout from the digital phase shifter DPS. Hence, a clock signal 2TS is formed which is a square-wave voltage whose phase is synchronous with that of the wobble signal and a clock signal 2TS with twice the frequency as compared with the wobble frequency. The clock signal 2TS or a clock signal TS at the output of the frequency divider DV, which clock signal TS corresponds to the wobble clock for the wobble track on the optical recording medium, is then used as a clock base for numerous other functions in the appliance for recording or playing back information.

Thus, by way of example, the write clock is formed as a multiple of the wobble frequency or of the frequency of the signal WS from a multiple of the clock signal TS or of the clock signal 2TS using an additional PLL, while the clock signal TS is provided for evaluating the ADIP information.

In principle, the necessary control signals can be generated by frequency division. Thus, by way of example, the actual rotation-speed signal for the spindle servo, which signal is required in order to control the rotation speed of the disc, is generated by frequency division of the clock signal TS. Since the clock signal TS is a square-wave signal whose phase is synchronous with that of the wobble signal or the signal WS, it is advantageously also used as a bit clock signal for decoding the information contained in the wobble signal.

In addition, the clock signal TS can also be used without demodulation of information contained in the wobble track for the purpose of determining the scanning location or for moving the scanning position by virtue of the clock signal TS being related to the rotation speed of the recording medium or being related to a wobble frequency which is known for a reference location.

In addition, the inventive circuit arrangement for generating the clock signal 2TS advantageously combines the advantages of a narrow filter with the possible alignment of the filter frequency, which means that the phase locked loop formed in this manner can follow the actual frequency very precisely.

So that a clock signal 2TS or TS can actually be generated in the starting phase or when the disc accelerates from a standstill to the rated rotation speed, the use of means for extending the capture range is advantageous. These means can be dispensed with when a constant rotation speed is used, since the dimensions of the disc mean that, at a constant rotation speed, changes in the wobble frequency which exceed the factor 2.7 are not to be expected. The effect of the means for extending the capture range is shown in FIG. 7. The graph shows control curves for the voltage-controlled oscillator VCO in the form of a relationship between the input signal VCOin and the output frequency Fout. For a mean analogue input signal, the voltage-controlled oscillator VCO delivers the mid-frequency. As a result of appropriate dimensioning, this frequency should be close to the wobble frequency which can be expected, which in this case has twice the value. To attain a high level of selectivity, the frequency variation should be small in relation to the control voltage. This is shown in FIG. 7. In this case, the steep curve NR characterizes high selectivity but little frequency variation. A shallow curve WR can cope with a greater frequency variation, but results in low selectivity. This property has been utilized such that a shallow curve WR is chosen in order to identify the wobble signal in the signal WS. That is to say the PLL circuit can lock onto the wobble frequency. The characteristic curve is then controlled more steeply, as a result of which the necessary selectivity is attained. The mid-frequency is aligned accordingly in this case.

Another exemplary embodiment is shown in FIG. 8.

In this case, an adder + is connected between the loop filter LF and the voltage-controlled oscillator VCO. For the locking operation, a triangular-wave voltage TRG is applied to the adder +. The effect achieved by this is that a particular frequency range is swept through, and the PLL locks when the frequency of the voltage-controlled oscillator VCO matches the wobble frequency. At this moment, the triangular-wave voltage TRG is frozen at the instantaneous value, so that the PLL can continue to oscillate normally.

The specified exemplary embodiments thus advantageously combine the advantages of a narrow filter with the possible alignment of the filter frequency, which means that the phase locked loop PLL can follow the actual frequency very precisely.

On account of a relatively high wobble frequency, which in the case of the DVD+RW is approximately 820 kHz at single rotation speed or single scanning speed, the reaction time in the control loop is very short. This means that it also becomes possible to ascertain the position of or to position a scanning device at a desired location very quickly and accurately.

It is also possible to carry out position determination during the search operation, which results in search operations being shortened. Since the wobble track is present both in unrecorded areas and in the recorded areas of a disc, it becomes possible to generate the clock signal TS in the entire area of the disc.

The clock signal TS is likewise used for decoding information stored in the wobble track on the recording medium. ADIP information contained in the wobble track on the recording medium is shown in FIGS. 9 to 11. The ADIP information is characterized by three signal types. These signal types are the sync pulse ADIPsync shown in FIG. 9, the logic zero ADIPZERO shown in FIG. 10, and the logic one ADIPONE shown in FIG. 11. They are formed by inverting a few wobbles or by phase modulation in a wobble cycle, which comprises eight wobble oscillations in the case of the DVD+RW. According to the direction in which wobbling starts, a distinction is drawn between positive wobbling PW and negative wobbling NW. Positive wobbling PW is characterized in that the wobble track starts by deflecting the recording track on the recording medium towards the inside of the recording medium. The modulation rule provided in the case of the DVD+RW is that a sync pulse ADIPsync starts with negative wobbling NW of four wobble oscillations, which are then followed by four wobble oscillations with positive wobbling PW, as shown in FIG. 9. The logic zero ADIPZERO shown in FIG. 10 starts with negative wobbling NW in one wobble oscillation, which is followed by five wobble oscillations with positive wobbling PW and by two wobble oscillations with negative wobbling NW. In line with FIG. 11, the logic one ADIPONE likewise starts with one wobble oscillation with negative wobbling NW, but this is then followed by three wobble oscillations with positive wobbling PW and alternately by two wobble oscillations with negative wobbling NW and positive wobbling PW.

The wobble oscillations shown are contained in the signal WS which is scanned from the recording medium and, as FIG. 1 shows, is very noisy. In order to detect the aforementioned signal types in the very noisy signal WS, a circuit arrangement as shown in FIG. 12 is provided. This circuit arrangement comprises two switches SW1, SW2 which are used to supply the signal WS scanned from the recording medium directly and in inverted form to a low-pass filter which is formed by a resistor R0 and a capacitor C0. The switches SW1, SW2 are alternately actuated in sync with the clock signal TS and, as shown in FIG. 12, with the clock signal TS and the negated clock signal $\overline{TS}$. The switches SW1, SW2, which are connected upstream of the low-pass filter and could be replaced by a changeover switch which is changed over with the clock signal $\overline{TS}$, form, with the invertor INV connected upstream of the switch SW2, a multiplier as shown by way of analogy in FIG. 6. The multiplier, used as a phase comparator, and the low-pass filter formed by the resistor R0 and the capacitor C0 are used to decode the information contained in the wobble signal without restoring the waveform of the wobbling, as present in the form of a recording track on the recording medium. The output DA of the circuit arrangement shown in FIG. 12 provides a signal which corresponds to the information stored in digital form in the wobble signal, or the ADIP information. The decoded wobble signal, as shown for a one, by way of example, in FIG. 13, is already available at the output of the low-pass filter. For digitization purposes, it is supplied to a threshold-value switch COMP, shown in FIG. 12, to which a comparison voltage REF is applied. The ADIP information recovered using these means is then evaluated using a downstream logic circuit in order to provide, by way of example, information about the current location of scanning on the recording medium.

To evaluate the information contained in the wobble signal or in the signal WS detected from the recording medium, switches SW1, SW2 or a changeover switch is/are actuated in a simple manner in sync with the phase of the clock signal TS and supply the signal WS detected from the recording medium to a digital evaluation device via a lowpass filter and comparator or threshold-value switch COMP.

A multiplier MTP containing an invertor IV or INV and a changeover switch US is thus advantageously used for clock signal generation and for recovering information from a signal WS which is scanned from the waveform in the recording track on the recording medium.

For the purpose of clock signal generation or for generating a square-wave voltage whose phase is synchronous with that of the signal WS detected from the undulating recording track on the recording medium, the changeover switch US, to which the signal WS is applied directly and in inverted form, is actuated using a digital phase shifter DPS to which a voltage-controlled oscillator VCO connected to the multiplier MTP via a loop filter LF supplies square-wave signals having twice the frequency and the frequency of the wobble signal. The phase locked loop formed is thus synchronized with the signal WS detected from the undulating recording track on the recording medium or with the wobble signal.

In the circuit arrangement for decoding information contained in the wobble signal, a changeover switch or switches SW1, SW2 in the multiplier is/are controlled using the clock signal TS whose phase is synchronous with that of the wobble signal, and the signal WS applied to the changeover device directly and in inverted form is supplied to a low-pass filter.

The appliance for recording or playing back information having means for signal generation from a wobble signal generally already has means which are used to provide a push-pull signal PP. The push-pull signal PP is thus already available and is supplied as signal WS to the means for signal generation from a wobble signal, as shown in FIG. 2, preferably via a simple bandpass filter BPF. The means for signal generation provided are a circuit arrangement for generating a clock signal TS and a circuit arrangement for decoding information contained in the wobble signal, which are preferably combined in a wobble detection circuit WFCG. Signals generated using the wobble detection circuit WFCG are then, as shown in FIG. 2, supplied to a first circuit block ADPBD for processing ADIP information contained in the decoded wobble signal, having means for bit decoding, and to a second circuit block WPDS, which contains means for controlling the rotation speed of and the write process on the recording medium and is connected to the first circuit block ADPBD. In the circuit arrangements provided as means for signal generation, a multiplier formed using an invertor and a changeover switch is then preferably used.

The embodiments described in the present case are indicated merely as examples, and a person skilled in the art can produce other embodiments of the invention which are within the scope of the invention.

The invention claimed is:

1. Appliance for recording or playing back information having means for signal generation from a noisy signal which is scanned from an undulating recording track on a recording medium and contains a wobble clock signal, wherein a clock signal is provided by a circuit arrangement comprising:

a changeover switch at which the noisy signal which is scanned from the undulating recording track on the recording medium and an inverted noisy signal which is scanned from the undulating recording track on the recording medium are applied and wherein the changeover switch for generating the clock signal is controlled by a digital phase shifter actuated by a frequency divider to which the clock signal is applied provided by a voltage-controlled oscillator connected via a loop filter to the changeover switch; and a phase comparator which is a multiplier formed by the changeover switch.

2. Appliance according to claim 1, wherein the circuit arrangement for generating the clock signal contains a phase comparator which comprises a changeover switch and two amplifiers, among which one amplifier is inverting and interconnected inputs of the amplifiers form a first input of the phase comparator to which the signal detected from the recording medium is supplied, the outputs of the amplifiers form an output of the phase comparator via the changeover switch, and a control input of the changeover switch, which is actuated with a digital comparison signal from the digital phase shifter forms a second input of the phase comparator.

3. Appliance according to claim 1, wherein the circuit arrangement for generating the clock signal contains a frequency divider for providing a clock signal which is a phase-synchronous square-wave voltage having the frequency of the wobble signal, said square-wave voltage being provided for decoding information contained in the wobble signal.

4. Appliance according to claim 1, wherein the changeover switch for generating a signal, which corresponds to information stored in the wobble signal, comprises two switches, one side of which is connected to the input of a low-pass filter and the other side of which has the signal and the inverted signal, respectively, applied to it.

5. Appliance according to claim 1, wherein the circuit arrangement for generating a signal, which corresponds to information stored in the wobble signal, further comprises a low-pass filter and a comparator for providing information contained in the wobble signal for a decoder.

6. Appliance according to claim 5, wherein the low-pass filter comprises a resistor and a capacitor.

7. Appliance for recording or playing back information having means for signal generation from a noisy signal which is scanned from an undulating recording track on a recording medium and contains a wobble clock signal, wherein a clock signal is provided by a circuit arrangement comprising:

a changeover switch at which the noisy signal which is scanned from the undulating recording track on the recording medium and an inverted noisy signal which is scanned from the undulating recording track on the recording medium are applied and wherein the changeover switch for generating the clock signal is controlled by a digital phase shifter actuated by a frequency divider, which supplies the wobble clock signal, which corresponds to the wobble clock signal of the undulating recording track on the recording medium, to the digital phase shifter, which actuates the changeover switch with an output signal being shifted by 90° with respect to the signal provided by the frequency divider and to which the clock signal is applied provided by a voltage-controlled oscillator connected via a loop filter to the changeover switch.

8. Appliance according to claim 7, wherein the circuit arrangement for generating the clock signal comprises a phase comparator which is formed by a multiplier to which the signal scanned from the undulating recording track and a signal from the digital phase shifter are supplied.

9. Appliance according to claim 7, wherein the circuit arrangement for generating the clock signal comprises a phase comparator which is a multiplier formed by a changeover switch which is controlled by the digital phase shifter and to which the signal scanned from the undulating recording track and the inverted signal scanned from the undulating recording track are applied.

10. Appliance according to claim 7, wherein the changeover switch is connected to two amplifiers, among which one amplifier is inverting and interconnected inputs of the amplifiers form a first input of a phase comparator to which the signal detected from the recording medium is supplied, the outputs of the amplifiers form via said changeover switch an output of the phase comparator and a control input of the changeover switch, which is actuated with a digital comparison signal from the digital phase shifter forms a second input of the phase comparator.

11. Appliance according to claim 7, wherein said wobble clock signal is a phase-synchronous square-wave voltage having the frequency of the wobble signal, and said square-wave voltage being provided for decoding information contained in the wobble signal.

12. Appliance for recording or playing back information having means for signal generation from a noisy signal which is scanned from an undulating recording track on a recording medium and contains a wobble clock signal, characterized in that a signal which corresponds to information stored in the wobble signal is provided by a circuit arrangement comprising:
a changeover switch at which the noisy signal which is scanned from the undulating recording track on the recording medium and an inverted noisy signal which is scanned from the undulating recording track on the recording medium are applied and wherein the changeover switch for generating a signal which corresponds to information stored in the wobble signal is controlled by a clock signal of the wobble signal.

13. Appliance according to claim 12, wherein the circuit arrangement for generating the clock signal comprises a phase comparator which is formed by a multiplier to which the signal scanned from the undulating recording track and a signal from the digital phase shifter are supplied.

14. Appliance according to claim 12, wherein said wobble clock signal is a phase-synchronous square-wave voltage having the frequency of the wobble signal, and said square-wave voltage being provided for decoding information contained in the wobble signal.

15. Appliance according to claim 12, wherein the changeover switch for generating a signal, which corresponds to information stored in the wobble signal, comprises two switches, one side of which is connected to the input of a low-pass filter and the other side of which has the signal and the inverted signal, respectively, applied to it.

16. Appliance according to claim 12, wherein the circuit arrangement for generating a signal, which corresponds to information stored in the wobble signal, further comprises a low-pass filter and a comparator for providing information contained in the wobble signal for a decoder.

17. Appliance according to claim 16, wherein the low-pass filter comprises a resistor and a capacitor.

18. Appliance for recording or playing back information having means for signal generation from a noisy signal which is scanned from an undulating recording track on a recording medium and contains a wobble clock signal, wherein a clock signal is provided by a circuit arrangement comprising:
a phase comparator which is a multiplier formed by a changeover switch which is controlled by a digital phase shifter and to which the signal scanned from the undulating recording track and an inverted signal scanned from the undulating recording track are applied.

19. Appliance according to claim 18, wherein the changeover switch is connected to two amplifiers, among which one amplifier is inverting and interconnected inputs of the amplifiers form a first input of the phase comparator to which the signal detected from the recording medium is supplied, the outputs of the amplifiers form via said changeover switch an output of the phase comparator and a control input of the changeover switch, which is actuated with a digital comparison signal from the digital phase shifter forms a second input of the phase comparator.

20. Appliance according to claim 18, wherein said wobble clock signal is a phase-synchronous square-wave voltage having the frequency of the wobble signal, and said square-wave voltage being provided for decoding information contained in the wobble signal.

21. Appliance according to claim 18, wherein the changeover switch for generating a signal, which corresponds to information stored in the wobble signal, comprises two switches, one side of which is connected to the input of a low-pass filter and the other side of which has the signal and the inverted signal, respectively, applied to it.

22. Appliance according to claim 18, wherein the circuit arrangement for generating a signal, which corresponds to information stored in the wobble signal, further comprises a low-pass filter and a comparator for providing information contained in the wobble signal for a decoder.

23. Appliance according to claim 22, wherein the low-pass filter comprises a resistor and a capacitor.

* * * * *